United States Patent [19]

Correll et al.

[11] Patent Number: 4,628,953

[45] Date of Patent: Dec. 16, 1986

[54] FUSIBLE PLUG SAFETY DEVICE FOR VENTING AIRCRAFT TIRES

[75] Inventors: Harold E. Correll, Uniontown; William P. Fulmer, Mogadore; James P. Jones, Jr., Akron, all of Ohio

[73] Assignee: Goodyear Aerospace Corporation, Akron, Ohio

[21] Appl. No.: 700,206

[22] Filed: Feb. 11, 1985

[51] Int. Cl.⁴ .............................................. F16K 17/40
[52] U.S. Cl. ...................................... 137/74; 152/427; 152/450; 220/89 B
[58] Field of Search .................... 137/72, 74; 152/151, 152/153, 330 R, DIG. 13, 427–430; 244/103 R; 169/57; 222/54; 301/5 R, 5 VH, 96, 97; 220/89 B; 116/217, 218, 34 R

[56] References Cited

U.S. PATENT DOCUMENTS

| | | | |
|---|---|---|---|
| 907,209 | 12/1908 | Whitney | 137/74 X |
| 2,216,351 | 10/1940 | Miller | 220/89 B |
| 3,138,406 | 6/1964 | Chamberlain | 220/89 B X |
| 3,157,219 | 11/1964 | Dimin et al. | 301/5 R X |
| 3,201,174 | 8/1965 | Stanton | 220/89 B X |
| 3,269,402 | 8/1966 | Horner | 137/74 |
| 3,517,683 | 6/1970 | Chandler | 301/5 R X |
| 4,221,231 | 9/1980 | Harvey et al. | 152/427 X |
| 4,314,596 | 2/1982 | Keresztes | 137/74 X |

Primary Examiner—G. L. Walton
Assistant Examiner—John S. Starsiak, Jr.
Attorney, Agent, or Firm—L. A. Germain; P. E. Milliken

[57] ABSTRACT

A fusible thermally responsive device (20) for mounting in a bore (12) provided for it in a wheel (10) to vent an overpressure condition caused by heat generated in an aircraft wheel and brake assembly comprises a rod-shaped length of a thermally activated virgin eutectic alloy (34) exhibiting a tolerance within ±1° F. of a specific melt temperature established for the alloy, which rod-shaped eutectic alloy in its virgin solid form has one end (34b) machined to a self-holding taper such as to be press-fit into a mating bore (28,48) having the same self-holding taper (28b,48b) in a cylindrical carrier member (22,42). The carrier is mounted in the wheel bore, either from the inside (22) or the outside (42) of the wheel, and a pair of O-ring type seals (32,52,62) provide a positive sealing relationship between the virgin eutectic (34) and the carrier (22,42) and between the carrier (22,42) and the wheel (10).

12 Claims, 4 Drawing Figures

U.S. Patent     Dec. 16, 1986     4,628,953
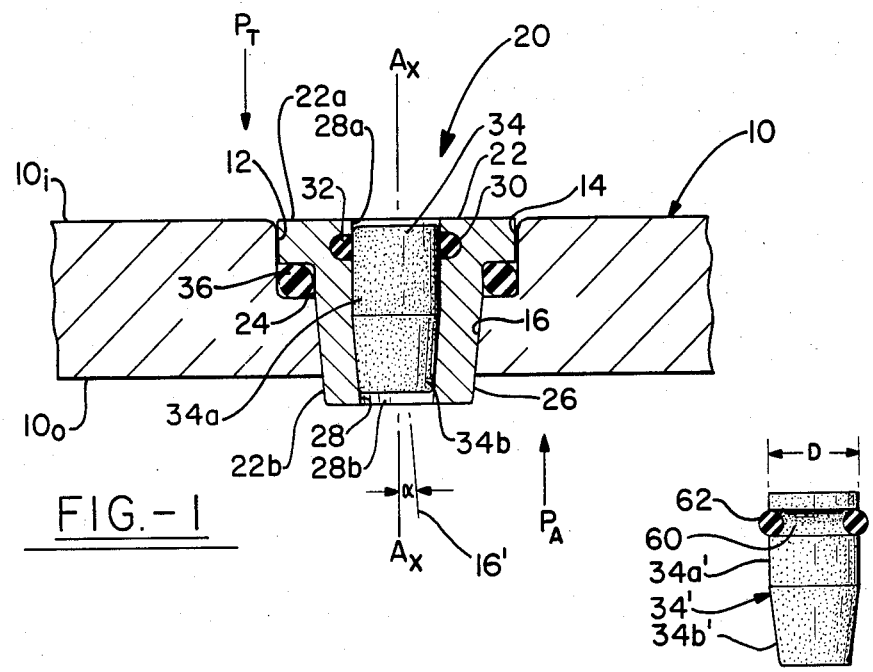
FIG.-1
FIG.-3A
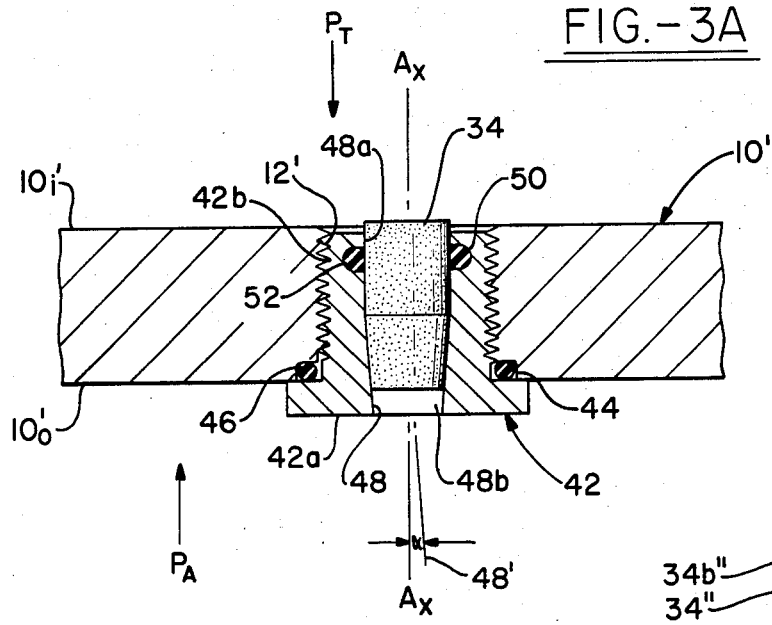
FIG.-2
FIG.-3B

FUSIBLE PLUG SAFETY DEVICE FOR VENTING AIRCRAFT TIRES

BACKGROUND OF THE INVENTION

This invention generally relates to aircraft wheels and more particularly to a unique configuration for a eutectic fusible plug device for mounting in a wheel and automatically venting overpressure in a mounted tire due to heat generated in a wheel and brake assembly upon braking of an aircraft.

Currently in the art of venting aircraft tires, it is the practice in the simplest form to provide a thermally sensitive and responsive fusible plug in a carrier member which is received within a bore in the wheel and in a location for rapid detection of heat generated in the wheel and brake assembly. The fusible plug is a particular composition of materials, i.e. a metal alloy, which when subjected to a specific temperature level changes from a normally solid form to a flowable liquid and is easily blown out of the carrier by tire overpressure. Fusible plugs of this type are generally made by raising the temperature of a virgin eutectic material above its specified melt temperature and pouring it into a bore provided for it in the carrier member. When cooled and solidified, the eutectic seemingly presents a neat configuration and a simple temperature responsive device.

The inventors of the present invention have found, however, that while the specification of the virgin eutectic material as it is received from the manufacturer is within ±1° F. of the specified melt temperature specification, remelting of the virgin eutectic in the production of fusible devices destroys such specification to where it may be as much as ±10° F. of the desired value. In this circumstance, one cannot be certain that the melt temperature of a particular fusible device is what it should be when installed in an aircraft wheel.

Changes in the virgin eutectic material may be attributed to the fact that the component materials which comprise the eutectic alloy are easily oxidized when heated. Also, foreign substances and/or impurities may enter the composite during the further heating and handling procedures. In addition, air bubbles and/or voids may be created in the fusible plug configuration when the melted eutectic is poured into the carrier member.

In addition to the above mentioned possible sources which may change the eutectic specification, it has been determined through microscopic studies of these type cast-in-place fusible plugs and more particularly for example a plug comprised of ASM Item N (Tin-Silver) eutectic fusible alloy, (Metals Handbook, 8th Edition, Table 2, page 864), that at temperatures near 400° F. some copper molecules from a brass configured carrier member migrate towards the eutectic material and some tin molecules from a tin-silver configured eutectic alloy migrate towards the brass carrier member. This interface molecular action between the carrier and eutectic materials results in the formation of an intermetallic layer which is very hard and brittle. Further, the intermetallic layer seems to grow rapidly at sustained elevated temperatures near 400° F. It is this layer which is considered instrumental in creating "leaker" fusible plugs when subjected to thermal shock resulting from the cyclic temperature excursions experienced in the aircraft environment.

It is therefore in accordance with one aspect of the present invention, an object to provide a fusible, temperature responsive device for mounting in an aircraft wheel to vent overpressure in a mounted tire due to heat generated in a wheel and brake assembly, which device is of simple construction, may be easily installed and serviced, and exhibits no more than ±1° F. difference from a manufacturer's established melt temperature for the eutectic material used in the device.

It is in accordance with another aspect of the invention an object to provide a eutectic fusible device which eliminates the formation of any intermetallic layer and thus assures the leakproof integrity of the fusible device in normal operations.

It is in accordance with still another aspect of the invention, an object to provide a eutectic fusible device having a particular self-holding or locking taper configuration of the constituent elements which may be merely press-fit into their operational orientation without need for special tools and which device further includes seal means to assure a positive leak-proof integrity of the device in normal operations.

These and other aspects and advantages of the invention are provided in a fusible thermally responsive device for mounting in a bore provided for it in a wheel to vent an overpressure condition caused by heat generated in a wheel and brake assembly comprising in combination:

a solid rod-shaped length of a thermally responsive virgin eutectic alloy composition having a specific diameter and a portion of its length machined towards one end thereof to a diameter such as to define a locking taper portion;

a cylindrical carrier member defining a bore through its lengthwise extent and having designated head and body portions, the head portion being of a greater diameter than the body portion and said bore adapted for receiving the rod-shaped length of virgin eutectic therein in a press-fit and locking relationship by reason of a portion of the bore length being of substantially the same diameter as the constant diameter portion of the eutectic while the remaining bore length is configured to substantially the same locking taper as machined into the eutectic;

a sealing means mounted in the bore of the carrier member to effect sealing of the constant diameter portion of the eutectic; and a sealing means mounted about the body portion of the carrier member to effect a sealing relationship between the head portion of the carrier member and the bore in the wheel;

said device being mounted in the wheel bore by a locking relationship as between it and the carrier member and the virgin eutectic is locked in the carrier member in a direction from the inside toward the outside of the wheel.

BRIEF DESCRIPTION OF THE DRAWING

The advantages of the invention will become evident from a consideration of the following detailed description when taken in view of the accompanying drawing wherein like reference numerals depict like elements and wherein:

FIG. 1 is an elevational view, in cross-section, through a small portion of an aircraft wheel rim showing the invention for a eutectic fusible device as it may be mounted from the inside of the wheel;

FIG. 2 is an elevational view, in cross-section, similar to FIG. 1 showing a modified version of the invention as it may be mounted in an aircraft wheel rim from the outside of the wheel; and FIGS. 3A and 3B are elevational views of a virgin eutectic fusible plug showing alternative configurations for positive sealing of the plug in its carrier.

DETAILED DESCRIPTION OF THE INVENTION

With reference to the drawing, FIG. 1 illustrates the fusible device in accordance with this invention as it may be mounted from the inside of a wheel while FIG. 2 illustrates a modified version as it may be mounted from the outside of a wheel. For installation and servicing of the device shown in FIG. 1, a mounted tire must be demounted to gain access to the fusible plug. This is not considered a disadvantage by some because it is deemed to be important, when the generated heat in the wheel assembly is at such a level as to cause melt out of the fusible material, that the tire should be demounted and inspected for overpressure damage also. However, in some applications the temperature level set for the fusible material is lower than obviously would be required to cause tire damage and therefore demounting of the tire is not necessary. Accordingly, an exteriorly mounted and serviceable fusible plug device is desired and the modified version shown in FIG. 2 provides for this type installation.

Referring now specifically to FIG. 1 of the drawing, a small cross-sectional portion of an aircraft wheel is illustrated and generally indicated by reference numeral 10. The inside surface of the wheel is indicated by numeral $10_i$ while the outside is indicated by numeral $10_o$, the wheel normally carrying a mounted tire (not illustrated) and having an internal and/or inflation pressure indicated by $P_T$. A bore 12 is provided through the material comprising the wheel 10, which bore 12 is characterized by an inward bore portion 14 and an outward bore portion 16, the bore portion 14 being of a greater diameter than the bore portion 16. The bore portion 16 is further characterized by presenting a self-holding or locking taper at its outward extent having an angle $\alpha$ preferably within the range of 1.5°–18° (0.25 in/ft–3.5 in/ft). The angle $\alpha$ is defined with respect to the axis of the bore 12 indicated in the drawing by line $A_x$—$A_x$ and a line 16' which is drawn parallel to the wall portion 16.

Mounted in the wheel bore 12 is a eutectic fusible device generally indicated by reference numeral 20. The device comprises a cylindrical carrier member 22 having a head portion 22a and a body portion 22b, the head portion 22a being of a greater diameter than the body portion 22b by a specific amount. The head portion 22a has a diameter which is substantially or slightly less than the diameter of the bore portion 14 of the wheel bore 12 such that the carrier member may be easily inserted in the bore 12. The body portion 22b is characterized by a constant diameter portion 24 and a locking taper portion 26 at the outward extent which substantially matches the locking taper 16 in the bore 12. A bore 28 is provided through the carrier member 22 which provides a direct communication from the inside of the wheel 10 having a tire pressure $P_T$ to the outside atmosphere indicated at $P_A$. The bore 28 has a constant diameter portion 28a at the inward end and a self-holding or locking taper portion 28b toward the outward end. The line 16' which defines angle $\alpha$ may also be parallel to the wall portion 28b. The constant diameter portion 28a is further characterized by an annular groove 30 which serves to carry an elastomeric seal or O-ring 32.

A eutectic fusible plug 34 is mounted in the bore 28 in the carrier member 22 and this plug is characterized by being comprised of a "virgin" eutectic alloy or composite material. A "virgin eutectic" may be defined as a composition of particular and/or specific fusible materials (tin, silver, lead, etc.) in a solid form meeting a specific melt temperature specification as established by the manufacturer of the eutectic and not exceeding a tolerance of ±1° F. Eutectic fusible alloys of this type are identified as A-P types in Table 2 of The Metals Handbook 8th edition pg. 864. For example, a virgin eutectic plug of N-type alloy may comprise 96.5% tin and 3.5% silver and have a melt temperature specification of 430° F.±1° F.

The eutectic plug 34 is preferably in a rod configuration having a diameter at 34a which is substantially the diameter of the carrier bore 28 for the major part of its length. The remaining part of its length 34b, which normally faces outwardly in the bore 28, is machined to a self-holding or taper which substantially matches the locking taper in the carrier bore at portion 28b. Installation of the eutectic plug 34 into the carrier bore 28, because of its fit and self-holding taper, is merely a press-fit and requires no exceptional force to retain it in the carrier 22. While the fit provides some sealing between the eutectic plug and the carrier, a positive seal is provided by the presence of the elastomeric seal or O-ring 32 in the normal operation of the wheel. Finally, a second elastomeric seal or O-ring 36 is mounted about the constant diameter portion 24 of the carrier member 22 such that when the carrier is press-fit into the bore 12 of the wheel, containment of the seal 36 in bore 12 is provided by the carrier head portion 22a and a sealing relationship exists as between the carrier 22 and the wheel bore 12.

It will be appreciated from the above description of FIG. 1 that an extremely simple configuration for a fusible device is provided by this invention. Further, the leak-proof integrity of the fusible plug is guaranteed positive by the tire pressure $P_T$ acting on the self-holding tapers existing between the various elements and further by the presence of elastomeric seals 36,32 which are mounted between the carrier 22 and the wheel bore 12 and between the eutectic plug 34 and carrier bore 28 respectively. More importantly, "cold-forming" of a virgin eutectic material as the fusible plug element guarantees that the melt temperature of the eutectic is within ±1° F. of the specified value as established by the manufacturer of the material. It will be further appreciated that, when the eutectic plug is melted out of the carrier bore 28 due to a heated wheel condition, a straight-through exit for escaping overpressure in the tire is provided. And finally, when meltout of the eutectic plug has happened and the cause of the heat and overpressure condition determined, it is a simple procedure to restore the fusible device to operating condition by merely cutting a length of virgin eutectic from a rod of material, cleaning the carrier bore of any residue, replacing O-ring seals if necessary, machining the proper locking taper at one end, and press-fitting the resulting plug into the carrier bore 28.

Referring now to FIG. 2 of the drawing, a modified version of the eutectic device of FIG. 1 is shown as it may be mounted in an aircraft wheel 10' from the outside of the wheel. The modification is made only to the carrier and to the bore provided for the fusible device in the wheel, the eutectic plug configuration remaining the same as described and shown with respect to FIG. 1. The modified cylindrical carrier is generally indicated by reference numeral 42 and comprises a head portion 42a and a body portion 42b, the head portion 42a being of a greater diameter than the body portion 42b by a specific amount. The body portion 42b and the bore 12' in the wheel 10' are threaded and the head portion 42a is of such a shape and/or is configured for driving the carrier 42 into its threaded engagement in the bore 12'. For example, the head portion 42a may be a hexhead or it may have no particular peripheral driving shape but instead have various type recesses which engage a drive tool for turning the carrier into the bore 12'. In any event, the carrier 42 is threaded home into the bore 12' which is also characterized by an annular groove 44 which seats an elastomeric seal or O-ring 46 such that a positive sealing engagement is made between the carrier head portion 42a and the bore 12'.

The modified carrier 42 also has a bore 48 therethrough for direct communication from the interior pressure side indicated by $P_T$ to the atmospheric side indicated by $P_A$. The bore 48 is similar in shape and configuration to the bore 28 in the carrier 22 of FIG. 1, however, its direction is reversed with respect to the head and body portions 42a, 42b of the carrier since the carrier 42 is inserted in the wheel bore 12' from the outside of the wheel. Thus, the bore 48 comprises a constant diameter portion 48a and a locking taper portion 48b, which portions operate to receive the eutectic plug 34 therein in a close press-fit relationship. In this arrangement angle $\alpha$ is defined with respect to the bore axis $A_x$—$A_x$ and a line 48' drawn parallel to the wall portion 48b. Finally, the interior end of the bore 48a has an annular groove 50 which seats an elastomeric seal or O-ring 52, the O-ring providing positive leak-proof integrity as between the bore 48 and the eutectic plug 34.

FIG. 3A of the drawing illustrates a virgin eutectic plug 34' as it may be modified by a machined-in annular groove 60 in the constant diameter portion 34a' of the rod-like plug. The groove 60 is adapted for mounting of an annular seal element 62 therein, which element may preferably be an O-ring type seal. In this configuration, the bores 28, 48 in the respective carrier members 22, 42 will not have annular grooves 30, 50 but will rather have smooth bores in their areas of constant diameter 28a and 48a respectively. Thus, when a plug 34' is inserted into the bore of a carrier member, a positive sealing relationship will exist as between the virgin eutectic plug and the carrier.

FIG. 3B of the drawing illustrates a virgin eutectic plug 34" as it may be modified, the shape thereof being machined from a solid rod of virgin eutectic alloy having a diameter "D" as indicated in both FIGS. 3A and 3B. In this configuration, the shaped eutectic 34" is such that the inward facing and outward facing extents of the rod length are reversed. For example, it will be readily apparent to those skilled in the art, that it may not be practical in some applications to mount an O-ring type seal 52 in the barrel portion 42b of the carrier member 42 as shown in FIG. 2. Accordingly the carrier 42 may be machined such that the holding taper portion 48b of its bore is ahead of the O-ring seal 52, i.e., towards the pressure side $P_T$ of the carrier mounting. The O-ring seal 52 therefore will be mounted in a groove machined in the head portion 42a of the carrier 42. In this circumstance, a standard rod-shaped length of virgin eutectic alloy must also be machined to the carrier bore configuration and this is the shape illustrated in FIG. 3B. Finally, and as suggested in FIG. 3A, the plug 34" may have an O-ring seal 72 mounted in a groove 70 in the portion of its length that has a constant diameter 34a" and such seal is indicated in ghost lines of FIG. 3B.

From the foregoing description, it will be appreciated by those skilled in this art, that the carrier members 22 and 42 will most likely not have to be replaced when the fusible device 20 is activated by heat at the eutectic melt temperature. To restore the device to normal service, it should only be necessary to install a new virgin eutectic plug in the carrier member. In this respect, service personnel may find it advantageous to color code the eutectic rods to indicate a particular melt temperature specification and when such color-coded plugs are inserted into the carrier bore, it may be readily seen from the outside of the wheel what the temperature specification of the particular thermal device is. Further, the carrier members 22 and/or 42 may be comprised of any of the conventionally used materials but preferably they will comprise a suitable brass or an aluminum alloy composition.

What is claimed is:

1. A fusible thermally responsive device for mounting in a bore which extends from the inside to the outside of a wheel to vent an overpressure condition caused by heat generated in an aircraft wheel and brake assembly comprising in combination:

a solid substantially rod-shaped length of a thermally responsive virgin eutectic alloy composition having a constant diameter for a portion of its length towards one end thereof and a locking taper for the remaining portion of its length at the opposite end;

a cylindrical carrier member received within the bore in the wheel and defining an axial bore through its lengthwise extent and having designated head and body portions, the head portion being of a greater diameter than the body portion and said axial bore adapted for receiving the rod-shaped virgin eutectic therein in a pressure-fit and locking relationship by reason of a portion of the bore length being of substantially the same diameter as the constant diameter portion of the eutectic while the remaining bore length is configured to substantially the same locking taper as the tapered portion of the eutectic;

a sealing means mounted in the bore of the carrier member to effect a sealing relationship between the constant diameter portions of the virgin eutectic and the carrier bore; and a sealing means mounted about the body portion of the carrier member to effect a sealing relationship between the head portion of the carrier member and the bore in the wheel;

said device being mounted in the wheel bore by a locking relationship between the carrier member and the wheel bore and the rod-shaped length of virgin eutectic is locked in the carrier member bore in a direction from the inside towards the outside of the wheel.

2. A fusible device as set forth in claim 1 wherein the solid rod-shaped length of virgin eutectic composition exhibits a tolerance within $\pm 1°$ F. of the specified melt temperature for the composition.

3. A fusible device as set forth in claim 2 wherein the wheel bore is configured to a locking taper towards its outward extent and said body portion of the carrier member is also configured to the same locking taper such that the carrier member may be press-fit into the wheel bore from the inside of the wheel.

4. A fusible device as set forth in claim 2 wherein the wheel bore and the body portion of the carrier member have threads for a threaded locking engagement between the two and the carrier member is threaded into the wheel bore from the outside of the wheel.

5. A fusible device as set forth in claim 1 wherein the sealing means which effects a sealing relationship between the constant diameter portion of the virgin eutectic and the carrier bore comprises an O-ring seal mounted in an annular groove machined into the carrier bore.

6. A fusible device as set forth in claim 1 wherein the sealing means which effects a sealing relationship between the constant diameter portion of the virgin eutectic and the carrier bore comprises an O-ring seal mounted in an annular groove machined into the constant diameter portion of the rod-shaped virgin eutectic.

7. A fusible device as set forth in claim 3 wherein the locking tapers as between the virgin eutectic and the carrier bore and as between the carrier member and the wheel bore have an angular relationship $\alpha$ with respect to the wheel bore axis within the range of 1.5–18 degrees.

8. A fusible device as set forth in claim 4 wherein the locking taper as between the virgin eutectic and the carrier bore has an angular relationship $\alpha$ with respect to the bore axis within the range of 1.5–18 degrees.

9. A fusible device as set forth in claim 1 wherein the carrier member comprises brass.

10. A fusible device as set forth in claim 1 wherein the carrier member comprises an alumimum alloy.

11. A fusible device as set forth in claim 1 wherein the elastomeric sealing means comprise O-ring seals.

12. A fusible device as set forth in claim 1 wherein the locking taper portion of the carrier member bore is positioned inwardly when the carrier is mounted in the wheel bore and the rod-shaped length of virgin eutectic has its locking taper portion also positioned inwardly of the wheel.

* * * * *